United States Patent
Schleipen et al.

(10) Patent No.: US 7,822,085 B2
(45) Date of Patent: Oct. 26, 2010

(54) METHOD OF CONTROLLING A DIODE DEVICE FOR USE IN OPTICAL STORAGE SYSTEMS

(75) Inventors: Johannes Joseph Hubertina Barbara Schleipen, Eindhoven (NL); Ruud Vlutters, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 590 days.

(21) Appl. No.: 10/562,285

(22) PCT Filed: Jun. 24, 2004

(86) PCT No.: PCT/IB2004/050996

§ 371 (c)(1),
(2), (4) Date: Dec. 22, 2005

(87) PCT Pub. No.: WO2005/001818

PCT Pub. Date: Jan. 6, 2005

(65) Prior Publication Data

US 2006/0159143 A1   Jul. 20, 2006

(30) Foreign Application Priority Data

Jun. 27, 2003   (EP) .................................. 03101931

(51) Int. Cl.
*H01S 3/00* (2006.01)
(52) U.S. Cl. ................................. 372/38.02; 372/38.07
(58) Field of Classification Search ............... 369/53.26, 369/59.11, 116, 121
See application file for complete search history.

(56) References Cited

U.S. PATENT DOCUMENTS

| | | | |
|---|---|---|---|
| 4,019,048 A * | 4/1977 | Maione et al. ............... 398/155 |
| 4,509,156 A | 4/1985 | Ohara et al. |
| 5,444,728 A | 8/1995 | Thompson et al. |
| 5,675,599 A * | 10/1997 | Abe et al. ................. 372/38.07 |
| 5,815,477 A * | 9/1998 | Kimura et al. ........... 369/47.53 |
| 5,831,959 A | 11/1998 | Sakanushi |
| 5,848,044 A | 12/1998 | Taguchi et al. |
| 6,285,692 B1 * | 9/2001 | Okayasu .................. 372/38.02 |
| 6,574,257 B1 * | 6/2003 | Thronton et al. ......... 372/46.01 |
| 2001/0043534 A1 | 11/2001 | Gyo |
| 2002/0061040 A1 | 5/2002 | Ishiwata et al. |
| 2003/0035451 A1 * | 2/2003 | Ishida et al. ............. 372/38.02 |
| 2004/0052185 A1 * | 3/2004 | Lehr et al. ................ 369/53.26 |

FOREIGN PATENT DOCUMENTS

| | | | |
|---|---|---|---|
| EP | 0262713 A1 | 4/1988 |
| EP | 0262713 B1 | 4/1988 |
| EP | 0405610 A2 | 1/1991 |

(Continued)

OTHER PUBLICATIONS

ISR Publication, International Publication No. WO2005/001818(A1).

*Primary Examiner*—Wayne R Young
*Assistant Examiner*—Aneeta Yodichkas (57) ABSTRACT

A system and method is provided which compensates for the effects of relaxation oscillations and turn-on delays of diode laser devices. In particular, there is provided a method and system for tuning the shape of the power profile of an output optical signal and its position with respect to a channel bit clock of an optical recording system.

20 Claims, 9 Drawing Sheets

FOREIGN PATENT DOCUMENTS

| | | |
|---|---|---|
| EP | 0405610 B1 | 1/1991 |
| EP | 0621588 A1 | 10/1994 |
| EP | 0621588 B1 | 10/1994 |
| JP | 03046132 A | 2/1991 |
| JP | 09083050 A | 3/1997 |
| JP | 2001056954 A | 2/2001 |
| JP | 2002123963 A | 4/2002 |
| JP | 2003060289 A | 2/2003 |

* cited by examiner

METHOD OF CONTROLLING A DIODE DEVICE FOR USE IN OPTICAL STORAGE SYSTEMS

The present invention relates generally to the field of optical storage systems, and more specifically to the positioning and shaping of an output optical signal in an optical storage system.

Figure 1:
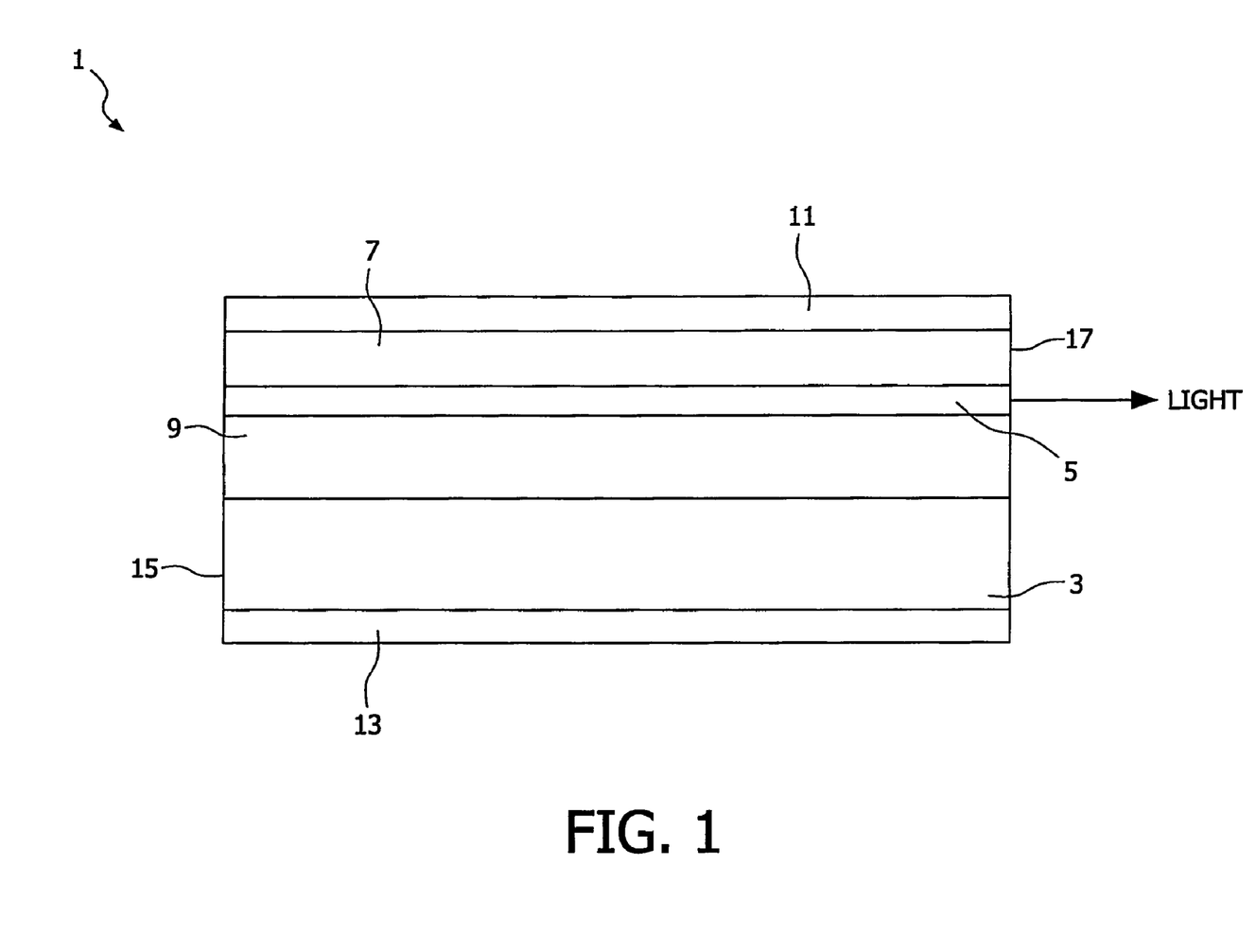
FIG. 1 is schematic representation of a typical semiconductor diode laser device.

A semiconductor laser, or 'diode laser device' generally consists of an optically active layer, sandwiched between p-type and n-type doped semiconductor materials. When forward biased, electrons (or 'carriers') and holes accumulate in the active region of these so-called hetero-junction devices where they can recombine to emit a photon. A typical diode laser device 1 formed on a semiconductor substrate 3 is shown in FIG. 1. An active layer 5 (formed from GaAs, for example) is sandwiched between a p-layer 7 (p-GaAlAs for example) and an n-layer 9 (n-GaAlAs for example). Metal contacts 11 and 13 facilitate the introduction of a current flow into the device 1. Light formed by recombination of electrons and holes from the n- and p-layers respectively is emitted by the device 1 out of the active layer 5. The ends 15,17 of the semiconductor device 1 are usually polished, or cleaved, in order to form an optical resonant cavity in which some emitted photons are retained within the cavity. The retained photons resonate in this resonant cavity defined by the ends 15,17 of the device 1, one of which (17 in this particular example) is generally only partially reflective. The end 17 may be a half silvered mirror for example. The photons that remain within the cavity stimulate emission of further photons within the active layer 5. Due to the partially reflective nature of the end 17 of the device, a small percentage of the photons emerge from the device 1 forming an intense, coherent (i.e. spatially and temporally in phase) optical signal. When the device 1 is operating in this regime it is said to be 'lasing', and the optical signal is typically a short burst or pulse of light.

The typical optical transient behaviour of such diode laser devices may be modelled using rate equations that describe the rate of change of carrier and photon densities. The use of such rate equations enables laser devices to be modelled and tested theoretically before fabrication for verification and experimental purposes.

One of the characteristics of diode laser devices which is a very important factor to be considered when such devices are used for applications in which a prompt lasing response to an input current is required, is the so-called 'turn-on delay'. If the diode laser device is biased below a threshold current (the current at which laser operation occurs), only spontaneous emission of photons occurs, and no laser operation is observed. Some photons may escape from the device in this situation due to spontaneous recombination of electrons and holes, but the amount of light produced by the device in this case will be negligible compared to the situation in which the laser is operating via stimulated emission. In addition, the light emerging as a result of spontaneous recombination processes will generally not be coherent.

As is well known and understood, as soon as the bias current is raised above the threshold value however, extra carriers are injected into the active layer of the device until the threshold condition for lasing is reached. At that point an inversion in the population of carriers occupying the upper and lower energy levels of the laser medium occurs such that a substantial percentage of atoms in the laser medium are excited into an upper energy state. It is the finite time before the condition for lasing is reached that is the cause of the turn-on delay. Since the present invention is concerned with this turn-on delay, the operation of the diode laser device will not be described in any greater detail.

Therefore, the turn-on delay occurs as soon as the input current has been switched on as it takes some time $\tau_{on}$ before the laser actually starts lasing.

Figure 2:
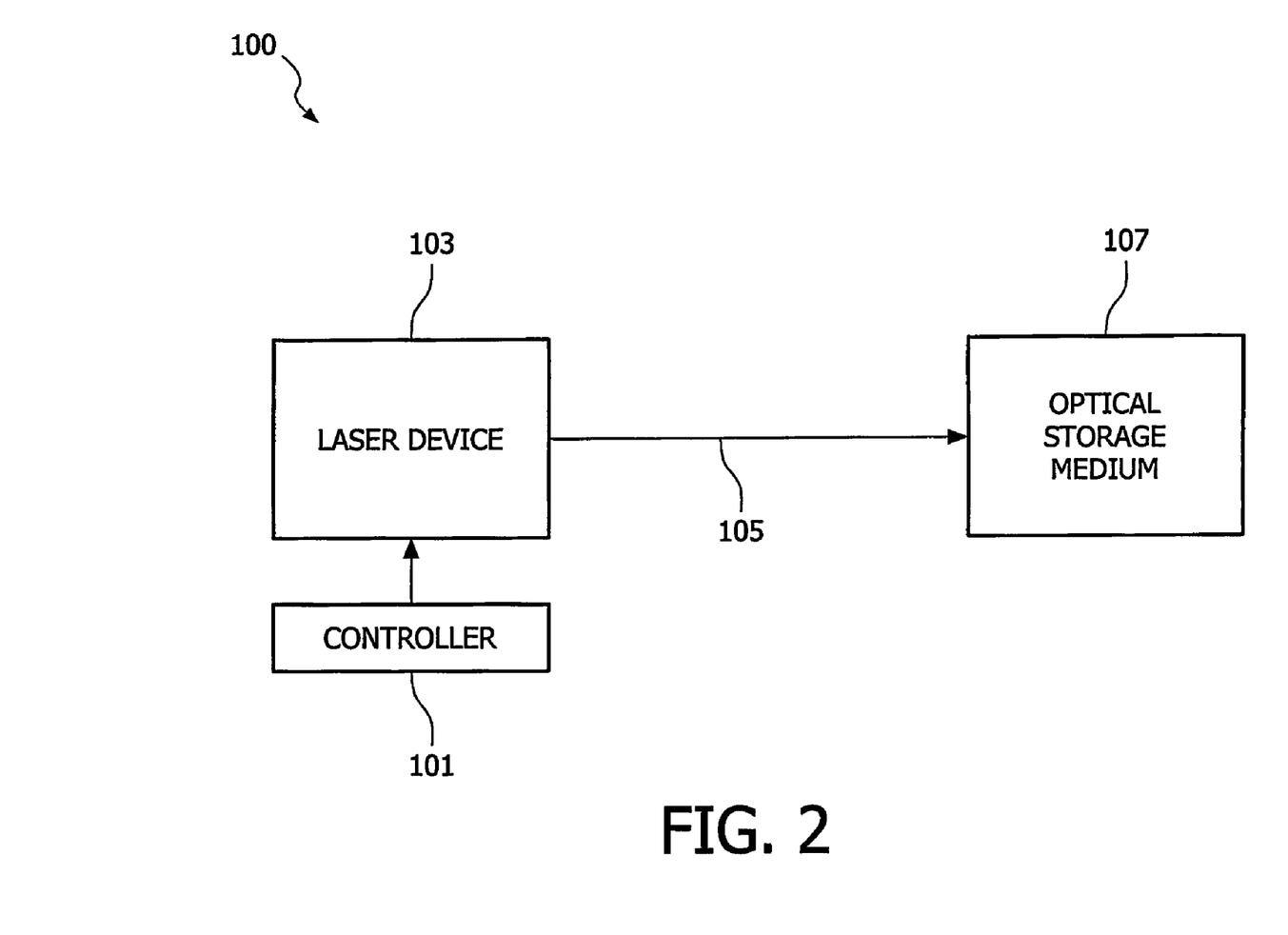
FIG. 2 is a schematic representation of a previously considered optical storage system.

In an optical storage system where a diode laser device is used to record data onto an optical storage medium, a delay in writing data due to the effects of turn-on delay can cause data to be misrepresented on the medium, and this can lead to errors when the data is read back. In extreme cases such errors may lead to a failure to read the optical medium altogether. A basic schematic diagram of an optical storage system 100 is depicted in FIG. 2 of the accompanying drawings. A controller 101 is operable to manage operation of a diode laser device 103. Specifically, the controller 101 provides the laser device 103 with a control signal which serves to initiate an output optical signal 105 from the device 103 at a given time. The optical signal 105 is incident on an optical storage medium 107 in order to write data to the medium 107 in accordance with standard write procedures. The optical signal 105 is typically of the form of a short burst or pulse of light.

The optical storage system 100 may operate by applying the optical signal 105 to the optical storage medium 107 for a specified length of time whenever a clock signal of the system occurs, in order to alter some characteristic of the storage medium 107 such as reflectivity, for example. The controller 101 may therefore provide the laser device 103 with a control signal whenever a clock signal is received. If, however, the laser device 103 does not produce an output optical signal for a time $\tau_{on}$ after the clock signal then the altered characteristic will not occur at the expected position on the storage medium. This can result in the problems mentioned above.

Figure 3:
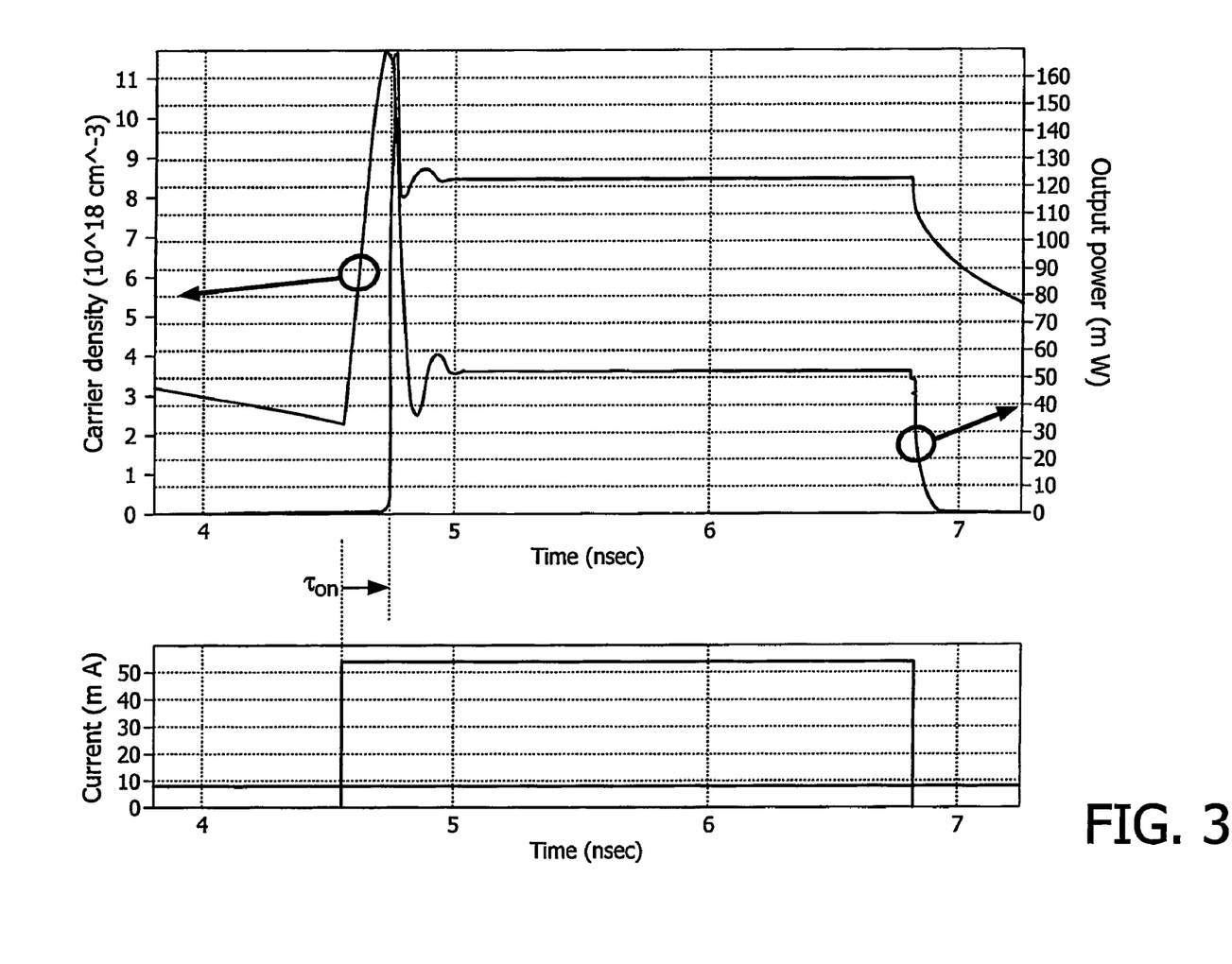
FIG. 3 is a set of two graphs showing how output power and carrier density of a typical InGaAsP infrared diode laser device varies in relation to input current.

FIG. 3 shows the effects of turn-on delay in relation to the output power of a typical infrared laser diode device. As shown, and as described above the diode laser takes a time, $\tau_{on}$, before lasing, and output of the optical signal, occurs. There is also an appreciable 'relaxation oscillation' which occurs as a result of the complex interplay between filling and emptying the carrier and photon reservoirs of the laser diode device, and which causes fluctuations in the output power of the optical signal near the beginning of the signal. Ideally, the output power profile of the output optical signal is square in shape, particularly for optical systems of the type described above. A square profile enables data to be written to an optical storage medium uniformly. It is clear, therefore, that the relaxation oscillations and turn-on delay cause the tuning and power profile of the output optical signal to be less than optimal.

Accordingly, both effects have a considerable effect on the reliability and effectiveness of write strategies in optical recording systems. This is especially apparent with high bit rates (for example, a contemporary DVD recorder may a have a bit rate of ~250 Mb/s) since errors will occur at a higher rate.

U.S. Pat. No. 5,831,959 to Mitsumi Electric Co. describes a laser control circuit suitable for use in a recordable optical disk drive. An auxiliary current is fed into a bypass capacitor so that the charge current for the bypass capacitor is increased. In this connection, the time to start the emission of a laser beam used for recording is reduced. U.S. Pat. No. 5,831,959 does not solve the problems of precisely positioning and shaping the optical signal with respect to the clock signal of the system however, and is only directed towards a basic reduction in turn-on delay. Specifically, U.S. Pat. No. 5,831,959 does not enable the power output profile of an optical signal to be tuned, nor does it solve the problems associated with unwanted oscillations (relaxations oscillations) at the start of an optical signal as solved by the present invention and as described below.

There is therefore a need for a method and system which is able to compensate for the effects of relaxation oscillations and turn-on delays of diode laser devices, especially when such diode laser devices are used in optical storage systems in which such effects are highly undesirable for the reasons outlined above.

In particular, a method and system is required in which the profile of the output power of an optical signal and the position of an optical pulse associated with the optical signal may be tuned, so that the optical pulse of an optical recording system may be synchronised with the channel bit clock of the system as required.

According to a first aspect of the present invention there is provided a method of controlling a diode laser device which is operable to receive a control signal and to output an optical signal when the control signal exceeds a threshold value, the method comprising: supplying, to the diode laser device as the control signal and at a predetermined turn-on time, a bias signal having a value which exceeds the threshold value, characterised by supplying to the diode laser device, as the control signal and at a predefined time before the predetermined turn-on time, a pre-bias signal, which has a magnitude less than the threshold value and extends for a time period, the predefined time, magnitude, and time period of the pre-bias signal determining a required output power profile of the output optical signal.

According to a second as aspect of the present invention there is provided a method of controlling a diode laser device in an optical system, the system including a laser diode device a controller, wherein the laser diode device is operable to receive a control signal from the controller and to output an optical signal when the control signal exceeds a threshold value, the method comprising:

supplying, to the diode laser device as the control signal and at a predetermined turn-on time, a bias signal having a value which exceeds the threshold value, characterised by supplying to the diode laser device, as the control signal and at a predefined time before the predetermined turn-on time, a pre-bias signal, which has a magnitude less than the threshold value and extends for a time period, the predefined time, magnitude, and time period of the pre-bias signal determining a required output power profile of the output optical signal.

According to a third aspect of the present invention there is provided an optical system comprising, a controller operable to output a control signal; and a laser diode device operable to receive a control signal from the controller, and to output an optical signal when the control signal exceeds a threshold value, wherein the controller is operable to output to the laser diode device, as the control signal and at a predetermined turn-on time, a bias signal having a value which exceeds the threshold value to the laser diode device, characterised in that the controller is operable to output to the laser diode device, as the control signal and before the predetermined turn-on time, a pre-bias signal to the laser diode device, which pre-bias signal has a magnitude less than the threshold value and extends for a time period, the predefined time, magnitude, and time period of the pre-bias signal determining a required output power profile of the output optical signal.

The above and other objects, features and advantages of the present invention will become apparent from the following description of embodiments thereof, taken in conjunction with the accompanying drawings in which

Figure 4:
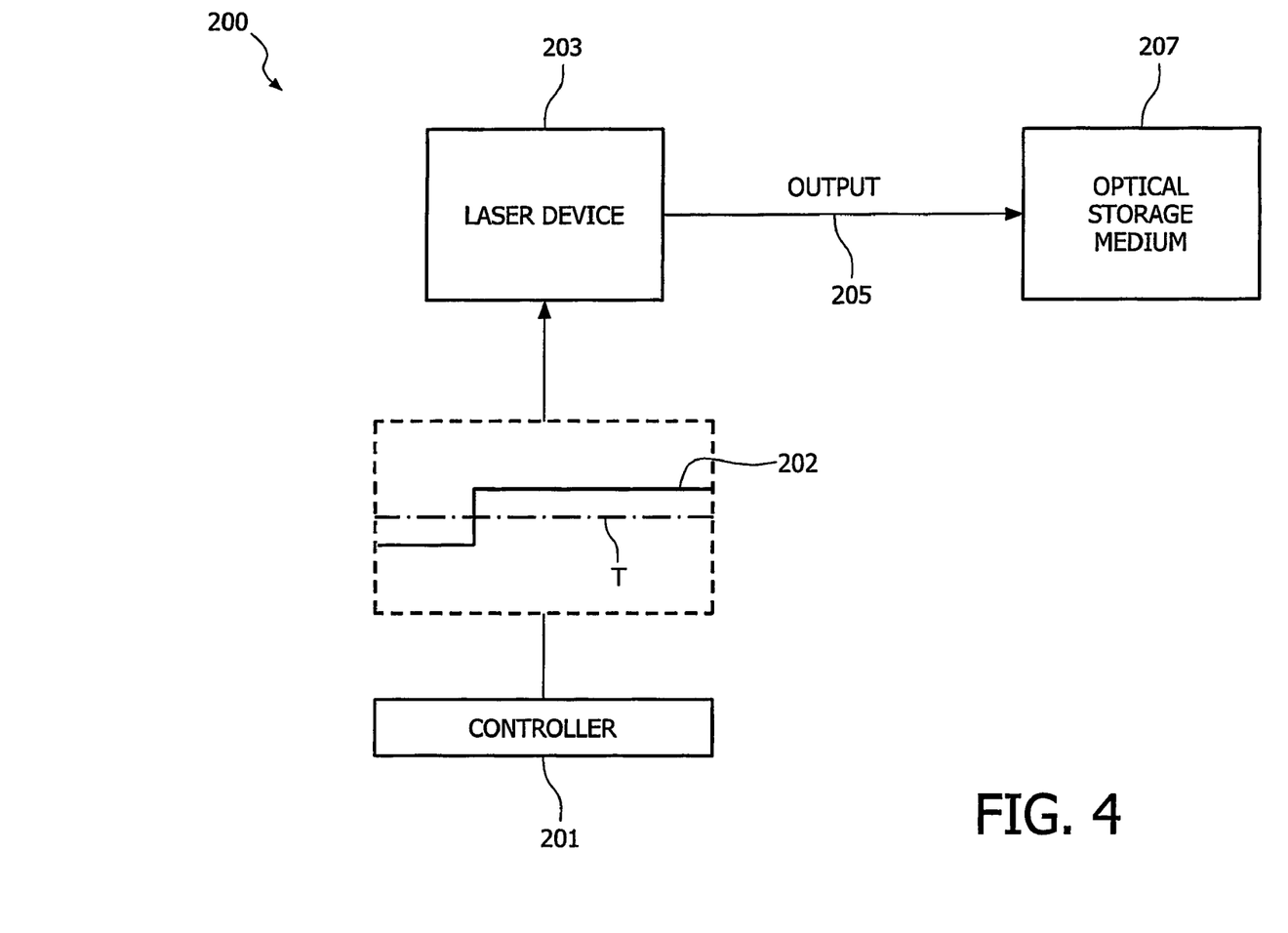
FIG. 4 is a schematic representation of an optical storage system in accordance with an aspect of the present invention.

FIG. 4 is a schematic representation of an optical storage system 200 in accordance with one aspect of the present invention.

A controller 201 is operable to manage operation of a diode laser device 203. Specifically, the controller 201 provides the laser device 203 with a control signal which serves to initiate output of an optical signal 205 from the device 203 at a given time. The optical signal 205 is incident on an optical storage medium 207 in order to write data to the medium 207 in accordance with standard write procedures. The optical signal is typically of the form of a short burst or pulse of light.

The optical storage system 200 may operate by applying the optical signal 205 to the optical storage medium 207 for a specified length of time whenever a clock signal of the system occurs in order to alter some characteristic of the storage medium 207 such as reflectivity, for example. The controller 201 may therefore provide the diode laser device 203 with a control signal whenever a clock signal is received.

A typical control signal 202 of the controller 201 is shown at 202 of FIG. 4. The control signal 202 is a step function, with its lower value below a value 'T' but greater than zero, and its higher value above a value 'T'. The higher value occurs at a later time than the lower value. The value 'T' is the threshold value at which the laser device begins to exhibit lasing operation. Hence, according to the system of FIG. 4, the laser device 203 is supplied with a control signal which is pre-biased at a value below threshold. The pre-bias signal will advantageously be applied to the laser device 203 before a clock signal of the system 200. The higher value of the control signal will occur simultaneously with the clock signal in order to provide the output 205.

Figure 5:
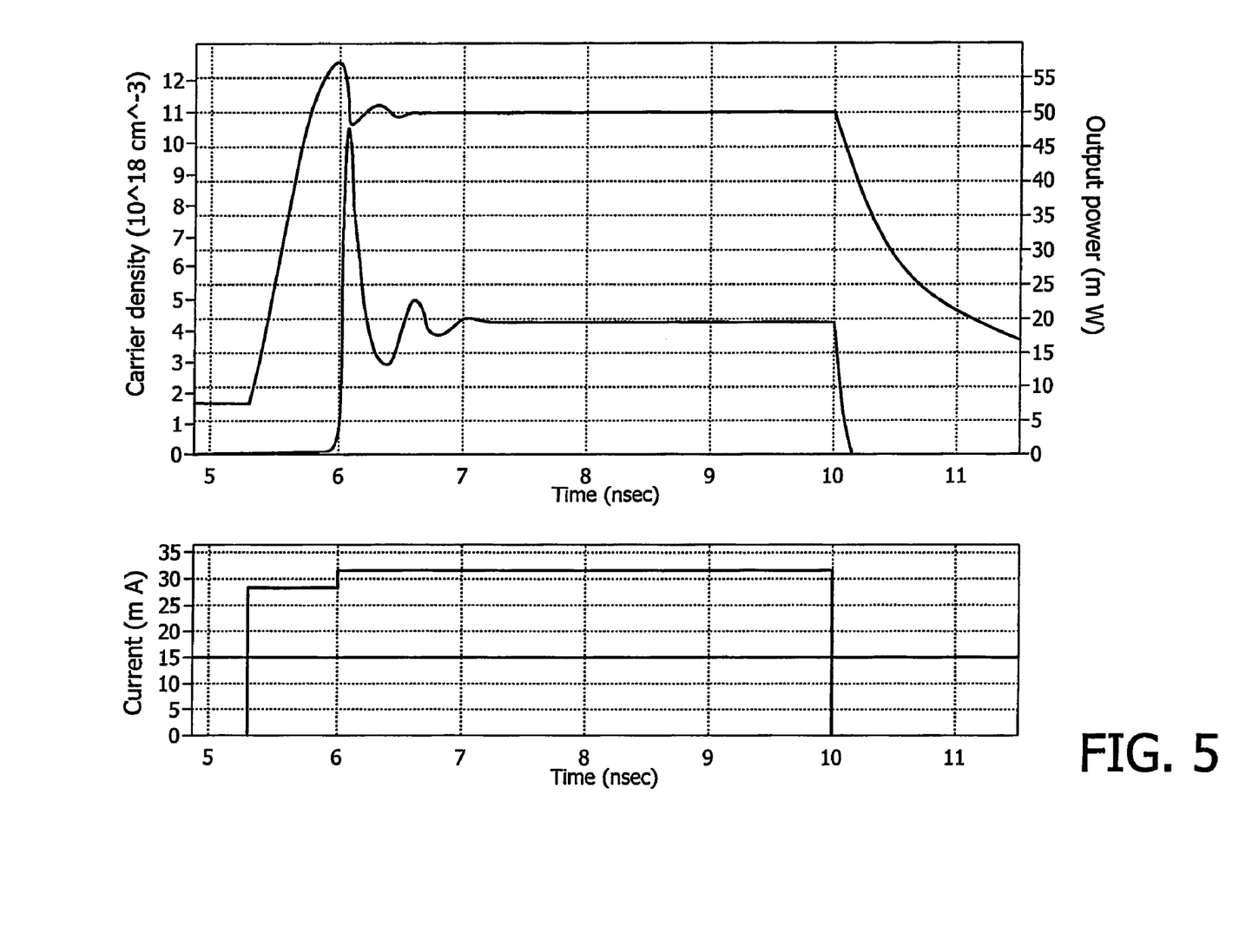
FIG. 5 is a set of two graphs showing how output power and carrier density of a typical InGaAsP infrared diode laser device varies in relation to input current according to an aspect of the present invention.

FIG. 5 shows a set of two graphs depicting how output power and carrier density of a typical InGaAsP infrared diode laser varies in relation to the input current according to an aspect of the present invention. Although the present invention will be described with reference to typical InGaAsP infrared diode laser devices, it will be appreciated by those skilled in the art that the method of the present invention is applicable in general to all diode laser devices which require an input current above a certain threshold value in order to achieve a lasing condition.

As shown in FIG. 5, the input current is stepped up to an initial level which is slightly below the threshold current value required for lasing to occur. In comparison with the case shown in FIG. 3, it is clear that this pre-biasing of the input current has significantly reduced the turn-on delay. By modifying the amplitude of the pre-biasing signal, the power profile of the output optical signal can be tuned. The amplitude modification affects the interplay between the generation and emission of photons and the recombination of charge carriers such that the emitted optical signal has a significantly squarer power profile.

Therefore, by adjusting the value (i.e. magnitude and/or duration) of the pre-bias signal, the output power profile of the optical signal may be finely tuned to the desired shape. Specifically, and as shown in FIG. 5, the relaxation oscillations may be attenuated to the extent that the profile tends to the desired square shape. As mentioned, a square power profile of the output optical signal is desirable as it enables data to be written to an optical recording medium with greater accuracy, and with greater uniformity when compared to optical systems in which a standard diode laser system is used.

The present invention therefore provides significant improvement over prior systems, as the output power profile of the optical signal may be finely tuned to provide the desired shape and timing characteristics.

Figure 6:
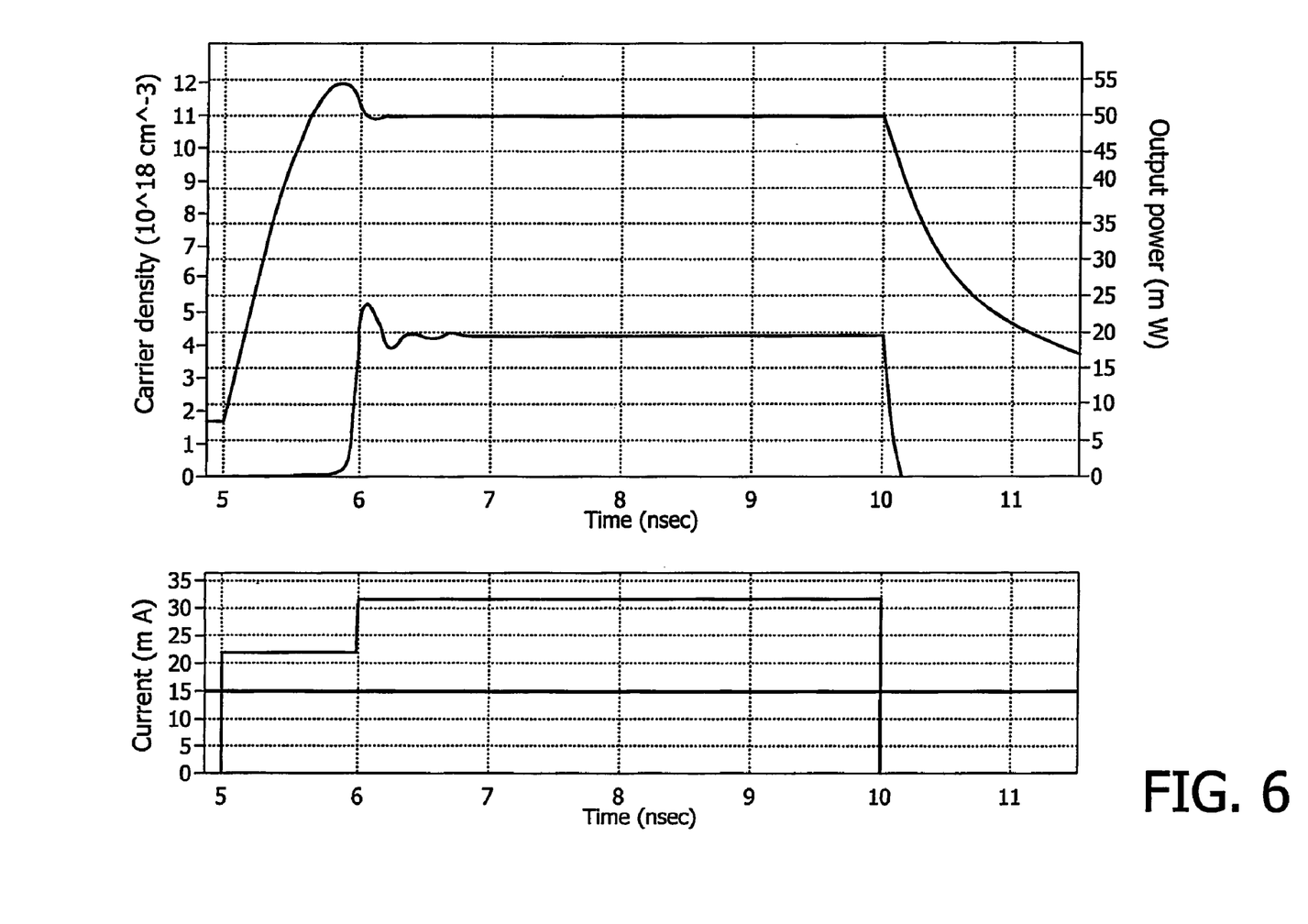
FIG. 6 is a set of two graphs showing how output power and carrier density of a typical InGaAsP infrared diode laser device varies in relation to input current according to an aspect of the present invention.

FIG. 6 shows two graphs depicting how output power and carrier density of a typical InGaAsP infrared laser diode varies in relation to the input current according to a second aspect of the present invention. FIG. 6 shows that the input pre-biasing current has been adjusted in value from that shown in FIG. 5. Specifically in this exemplary embodiment, the pre-biasing signal has a longer duration, and a reduced height (i.e. current value) compared to the pre-biasing signal of FIG. 5.

As can be seen, this results in an output optical signal with significantly reduced turn-on delay compared to the prior art systems shown in FIG. 3. In addition, the shape of the optical signal has been altered by the tuning of the pre-biasing current. Specifically, the relaxation oscillations have been significantly reduced resulting in an output optical signal with a much squarer power profile than previously obtained and as shown in both FIGS. 3 and 5.

As before, this is particularly desirable in optical recording systems as it means that there is less variation in the output power of the optical signal near the start of the signal, meaning that information may be written in a more uniform fashion onto an optical storage medium such as compact disc-recordable media (e.g. CD-R, CD±RW), DVD-recordable media (e.g. DVD-R, DVD±RW), or Blu-Ray discs etc. The application of the pre-bias signal as depicted in FIG. 6 illustrates that the output power profile of the output optical signal may, advantageously, have its shape finely tuned to suit a particular application. In this connection, the power profile of FIG. 6 is significantly square in shape which is particularly advantageous for optical recording systems as explained above.

It will, however, be appreciated by those skilled in the art, that the exact nature (i.e. duration and/or magnitude) of the pre-bias pulse (or pulses) may be adjusted as necessary in order to obtain the required output power profile of the output optical signal, and that the examples given herein are presented merely as an aid in order to explain the inventive concept embodied by the present invention.

For example, the pre-bias signal may comprise of a multitude of 'pre-pulses' arranged in a step formation. Alternatively, the pre-bias signal may comprise of a combination of pre-pulses having temporally varying magnitudes (such as triangular shaped pre-pulses for example, or curved pre-pulses). The exact nature of the pre-bias signal, and in particular its magnitude at a given time and its overall duration may, therefore, be determined for the particular application in order to finely tune the output power profile of the output optical signal to that desired. It is not, therefore, intended that the pre-bias signals be limited to those given in the examples and shown in the accompanying figures.

Figure 7A:
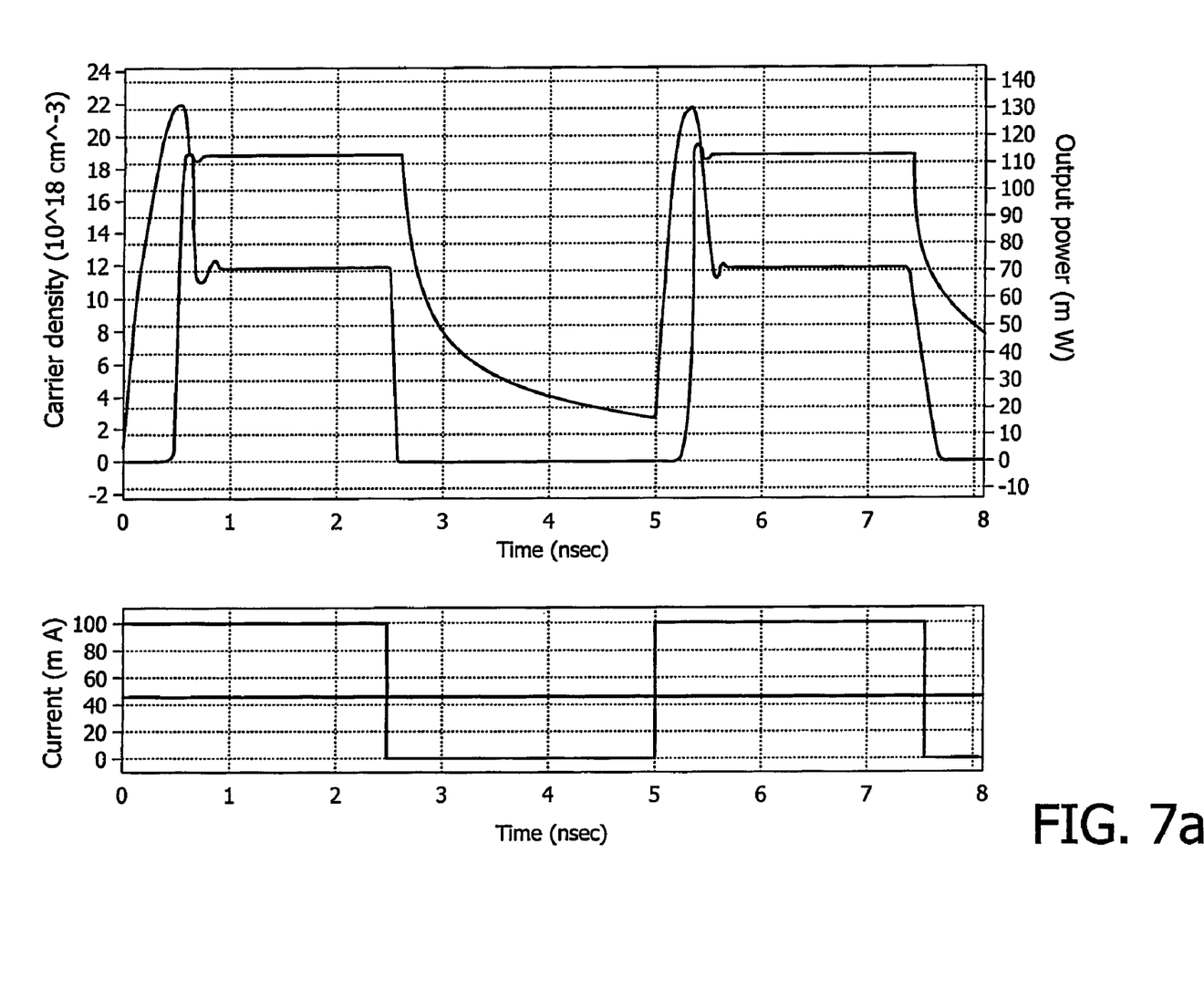
FIGS. 7a and 7b show a set of four graphs showing how output power and carrier density of a typical InGaAsP infrared diode laser device varies in relation to input current according to an aspect of the present invention.
Figure 7B:
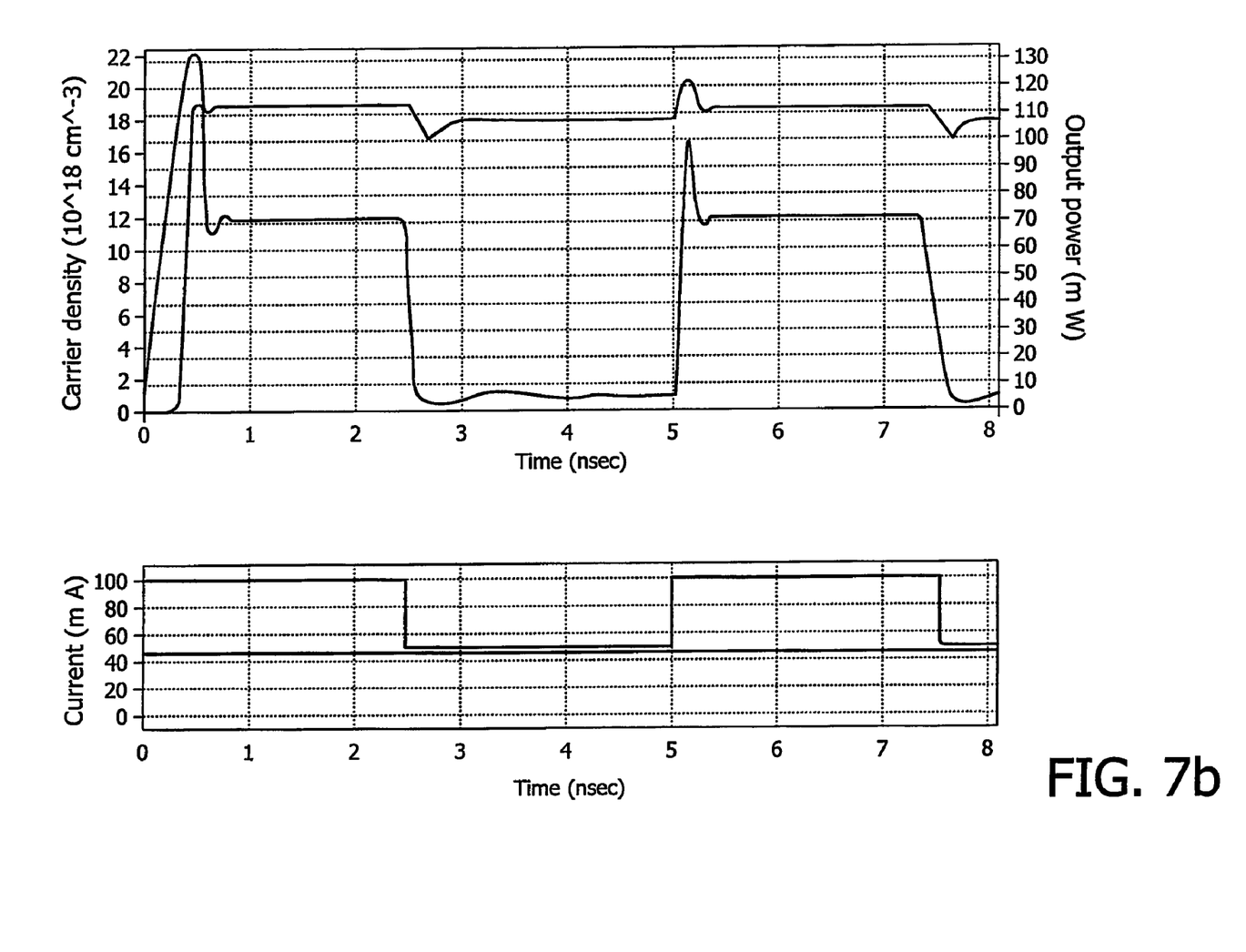

FIG. 7 shows a further example for a specific laser device with threshold current of 46 mA operated with a current peak value of 100 mA. In FIG. 7a the laser is biased with 0 mA current, whereas in FIG. 7b the bias current is just above threshold. As can be seen from the figures, the turn-on delay for this device is 0.34 nsec and 0.11 nsec for operating conditions $I_{bias}$=0 mA and $I_{bias}$=50 mA respectively. As expected it takes a longer time for the laser device to start lasing when the carrier reservoir has to filled from empty, i.e. when the current bias equals zero or almost zero (see FIG. 7a). Therefore, according to the present invention, the turn-on delay can be minimized by keeping the bias current between two succeeding optical pulses at an acceptable level near threshold. Since the trailing edge of the optical pulses is at the same position for both situations (there is no such thing as "turn-off" delay), this implies that the exact nature of the power profile of optical signal depends on the bias conditions.

This is of crucial importance in high speed phase change recording, where the physical length of the written marks on an optical recording medium is directly related to the optical pulse duration. A deviation of the pulse length from an integer multiple of the bit clock yields timing jitter, and hence leads to degraded read-out performance.

FIG. 7 demonstrates that, according to the present invention the position of the output optical signal can be exactly tuned to coincide with the (current) bit clock by applying a pre-bias signal just before the actual writing pulses of the output optical signal. This pre-bias signal brings the carrier density just below its threshold value at the time when the actual code word is going to be written and the diode laser device should start to emit photons.

One can also see that the shape of the leading edge of the optical signal, normally dominated by relaxation oscillations, can be tuned very accurately such that the ringing disappears completely. This optical signal shaping requires additional write levels in phase-change write strategies that can be accurately controlled in time domain (sub-nanosec). A very sharp transition can therefore be obtained using the method of the present invention, regardless of the internal electrical impedance of the laser device.

Figure 8:
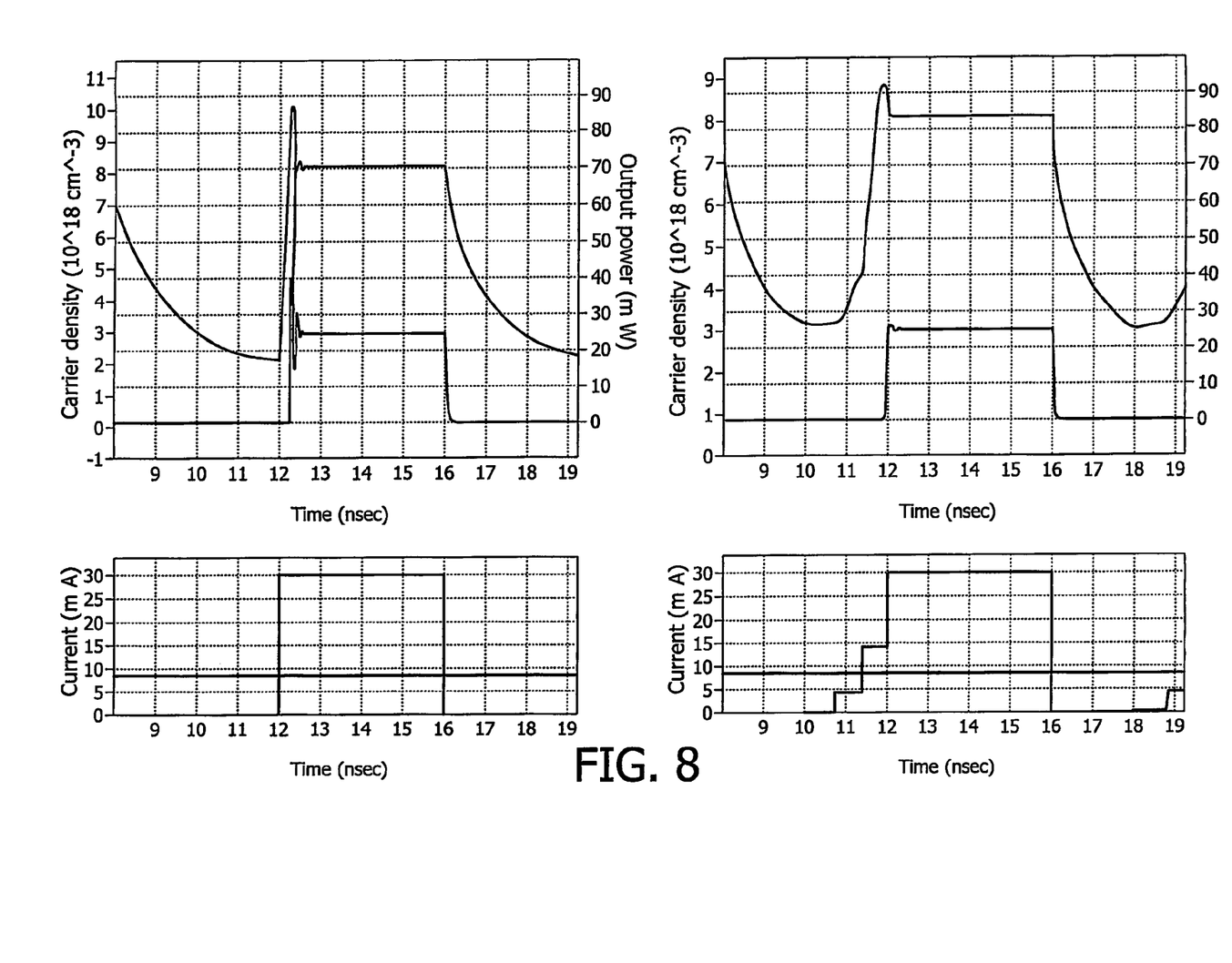
FIG. 8 is a set of two graphs showing how output power and carrier density of a typical InGaAsP infrared diode laser device varies in relation to input current according to an aspect of the present invention.

FIG. 8 shows how output power and carrier density of a typical InGaAsP infrared diode laser device varies in relation to the input current according to a fourth aspect of the present invention. As can be seen the pre-bias signal has been stepped several times up to the value required above the threshold current value.

By stepping the current in this manner, the shape of the output optical signal can be accurately tuned as shown in FIG. 8. Specifically, an improved square shape of the output optical signal power profile is obtained with virtually no ringing (relaxation oscillations). Again, the turn-on delay has been effectively reduced to zero.

Although the present invention has been described with reference to optical storage systems, it will be appreciated by those skilled in the art that the present invention is applicable to all situations in which a prompt, well tuned lasing response to an input current is required. In particular for example, the present invention may advantageously be applied to medical laser uses in which it is desirable to have a prompt, highly tuned output optical signal with no fluctuations in output power (e.g. ringing).

It will further be appreciated that the exact shape of the output power profile of the output optical signal as described herein and as shown in the accompanying figures is not intended to be limiting. In particular, it is intended that the shape of the output power profile of the output optical signal is capable of being tuned to suit a particular application, and need not, therefore, necessarily be square in shape.

The invention claimed is:

1. A method of controlling a diode laser device which is operable to receive a control signal and to output an optical signal when the control signal exceeds a threshold value, the method comprising acts of:

supplying, to the diode laser device as the control signal and at a predetermined turn-on time, a write bias signal having a value which exceeds the threshold value, wherein the threshold value is a lasing threshold for the diode laser device, and supplying to the diode laser device, as the control signal and at a predefined time before the predetermined turn-on time, a pre-bias signal, which has a magnitude that varies, is less than the threshold value and extends for a time period to immediately before the write bias signal, wherein the predefined time, magnitude, and time period of the pre-bias signal are selected to tune an output power profile of the output optical signal to a desired profile.

2. The method as claimed in claim 1, wherein the pre-bias signal comprises a series of pre-bias pulses, having respective predefined times, magnitudes and extents, which are selected to tune the output optical signal to have a desired power profile.

3. The method as claimed in claim 1, wherein the pre-bias signal is a stepped value.

4. The method as claimed in claim 1, wherein the predetermined turn-on time occurs simultaneously with a clock signal.

5. The method as claimed in claim 1, comprising an act of modifying the predetermined turn-on time based on a required output power profile of the output optical signal.

6. The method as claimed in claim 1, comprising an act of modifying at least one of the predefined time, magnitude, and time period of the pre-bias signal for tuning a position of the output optical signal to coincide with a channel bit clock of an optical recording system.

7. The method as claimed in claim 1, further comprising an act of modifying values of the predefined time, magnitude, and time period of the pre-bias signal for tuning the output power profile of the output optical signal.

8. A method of controlling a diode laser device in an optical system, the system including a laser diode device a controller, wherein the laser diode device is operable to receive a control signal from the controller and to output an optical signal when the control signal exceeds a threshold value, the method comprising acts of:

supplying, to the diode laser device as the control signal and at a predetermined turn-on time, a write bias signal having a value which exceeds the threshold value, wherein the threshold value is a lasing threshold for the diode laser device; and supplying to the diode laser device, as the control signal and at a predefined time before the predetermined turn-on time, a pre-bias signal, which has a magnitude that varies, is less than the threshold value and extends for a time period to immediately before the write bias signal, wherein the predefined time, magnitude, and time period of the pre-bias signal are selected to tune an output power profile of the output optical signal to a desired profile.

9. The method as claimed in claim 8, wherein the pre-bias signal comprises a series of pre-bias pulses, having respective predefined times, magnitudes and extents, which are selected to tune the output optical signal to have a desired power profile.

10. The method as claimed in claim 8, wherein the pre-bias signal is a stepped value.

11. The method as claimed in claim 8, wherein the predetermined turn-on time occurs simultaneously with a clock signal.

12. The method as claimed in claim 8, comprising an act of modifying the predetermined turn-on time based on a required output power profile of the output optical signal.

13. The method as claimed in claim 8, comprising an act of modifying at least one of the predefined time, magnitude, and time period of the pre-bias signal for tuning a position of the output optical signal to coincide with a channel bit clock of an optical recording system.

14. The method as claimed in claim 8, further comprising an act of modifying values of the predefined time, magnitude, and time period of the pre-bias signal for tuning the output power profile of the output optical signal.

15. An optical system comprising, a controller operable to output a control signal; and a laser diode device operable to receive a control signal from the controller, and to output an optical signal when the control signal exceeds a threshold value, wherein the controller is operable to output to the laser diode device, as the control signal and at a predetermined turn-on time, a write bias signal having a value which exceeds the threshold value to the laser diode device, wherein the threshold value is a lasing threshold for the diode laser device, and wherein the controller is operable to output to the laser diode device, as the control signal and before the predetermined turn-on time, a pre-bias signal to the laser diode device, which pre-bias signal has a magnitude that varies, is less than the threshold value and extends for a time period to immediately before the write bias signal, wherein the predefined time, magnitude, and time period of the pre-bias signal are selected to tune an output power profile of the output optical signal to a desired profile.

16. The optical system as claimed in claim 15, wherein the controller is operable to supply a pre-bias signal comprising a series of pre-bias pulses, having respective predefined times, magnitudes and extents, which are selected to tune the output optical signal to have a desired power profile.

17. The optical system as claimed in claim 15, wherein the controller is operable to supply a multi-valued pre-bias signal to the laser diode device comprising a combination of pre-pulses having temporally varying magnitudes.

18. The optical system as claimed in claim 15, wherein the controller is operable to output to the laser diode device as the control signal and before the predetermined turn-on time, a pre-bias signal, which has a value less than the threshold value, and precedes a clock signal of the system.

19. The optical system as claimed in claim 15, wherein the controller is operable to output to the laser diode device as the control signal and before the predetermined turn-on time, a pre-bias signal which has a value less than the threshold value, wherein the controller is operable to determine the predetermined turn-on time by a required output power profile of the output optical signal.

20. The optical system as claimed in claim 15, wherein the controller is operable to output to the laser diode device as the control signal and before the predetermined turn-on time, a pre-bias signal which has a value less than the threshold value, wherein the controller is operable to determine the value of the pre-bias signal by a required output power profile of the output optical signal.

* * * * *